(12) United States Patent
Liu (10) Patent No.: US 12,526,189 B2
(45) Date of Patent: Jan. 13, 2026

(54) NETWORK SLICE UPGRADING METHOD AND DEVICE

(71) Applicant: ZTE CORPORATION, Shenzhen (CN)

(72) Inventor: Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 384 days.

(21) Appl. No.: 18/254,225

(22) PCT Filed: Sep. 26, 2021

(86) PCT No.: PCT/CN2021/120768
§ 371 (c)(1),
(2) Date: May 24, 2023

(87) PCT Pub. No.: WO2022/111030
PCT Pub. Date: Jun. 2, 2022

(65) Prior Publication Data
US 2024/0097978 A1    Mar. 21, 2024

(30) Foreign Application Priority Data
Nov. 25, 2020   (CN) .......................... 202011338018.4

(51) Int. Cl.
*H04L 41/082* (2022.01)
*H04L 41/0893* (2022.01)

(52) U.S. Cl.
CPC ........ *H04L 41/082* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 6,453,468 B1 * | 9/2002 | D'Souza ................ | G06Q 30/06 717/168 |
| 7,555,551 B1 * | 6/2009 | McCorkendale ......... | G06F 8/65 709/239 |

(Continued)

FOREIGN PATENT DOCUMENTS

| CN | 104410672 A | 3/2015 |
|---|---|---|
| CN | 105379191 A | 3/2016 |

(Continued)

OTHER PUBLICATIONS

Industrial Property Cooperation Center (IPCC). Search Report for JP Application No. 2023-530859 and English translation, mailed May 24, 2024, pp. 1-58.

(Continued)

*Primary Examiner* — Philip Wang
(74) *Attorney, Agent, or Firm* — Vivacqua Crane, PLLC (57) ABSTRACT

A network slice upgrading method and device are disclosed. The method may include, acquiring version information of each service instance, and receiving an upgrade instruction; downloading an upgrade package after receiving the upgrade instruction, and simultaneously performing an upgrade to a service instance in each NF according to the upgrade package until each upgrade is completed; wherein, the upgrade instruction comprises a preset upgrade proportion and an upgrade order.

8 Claims, 7 Drawing Sheets

(56) References Cited

U.S. PATENT DOCUMENTS

| | | | |
|---|---|---|---|
| 7,873,733 B2 | 1/2011 | Kodama et al. | |
| 7,958,210 B2 * | 6/2011 | Sakurai | G06F 8/65 709/221 |
| 9,799,482 B2 | 10/2017 | Ohsawa et al. | |
| 10,203,979 B2 * | 2/2019 | Shimizu | H04W 72/20 |
| 10,609,530 B1 * | 3/2020 | Patil | G06F 8/65 |
| 11,175,899 B2 * | 11/2021 | Kalaskar | G06F 8/65 |
| 11,576,031 B2 | 2/2023 | Pestaña et al. | |
| 11,836,478 B2 * | 12/2023 | Zu | G06F 9/45558 |
| 2011/0099266 A1 | 4/2011 | Calder et al. | |
| 2016/0337172 A1 * | 11/2016 | Yu | H04L 12/4641 |
| 2016/0364226 A1 | 12/2016 | Takano et al. | |
| 2017/0187572 A1 * | 6/2017 | Wu | H04L 43/50 |
| 2018/0132117 A1 * | 5/2018 | Senarath | G06F 11/301 |
| 2018/0302303 A1 * | 10/2018 | Skovron | G06Q 10/06 |
| 2018/0373521 A1 * | 12/2018 | Huang | H04L 67/34 |
| 2019/0349792 A1 * | 11/2019 | Xu | H04L 41/342 |
| 2020/0021487 A1 * | 1/2020 | Yao | H04L 41/04 |
| 2020/0026507 A1 | 1/2020 | Bassani et al. | |
| 2020/0296571 A1 | 9/2020 | Puente Pestaña et al. | |
| 2022/0083324 A1 * | 3/2022 | Singh | G06F 3/065 |
| 2022/0214870 A1 * | 7/2022 | Zu | G06F 8/65 |
| 2025/0150428 A1 * | 5/2025 | Jung | H04L 1/22 |

FOREIGN PATENT DOCUMENTS

| | | | |
|---|---|---|---|
| CN | 106982129 A | 7/2017 | |
| CN | 109391482 A | 2/2019 | |
| CN | 110572284 A | 12/2019 | |
| CN | 111399866 A | 7/2020 | |
| CN | 111897543 A | 11/2020 | |
| JP | 2008250427 A | 10/2008 | |
| JP | 2009230171 A | 10/2009 | |
| JP | 2009244945 A | 10/2009 | |
| JP | 2015146355 | 8/2015 | |
| JP | 2018032940 A | 3/2018 | |
| JP | 2020154634 A | 9/2020 | |
| JP | 2020537449 A | 12/2020 | |
| KR | 102839284 B1 * | 7/2025 | G06Q 10/063 |
| WO | WO-2018089634 A1 * | 5/2018 | G06F 9/5077 |
| WO | WO-2019024679 A1 * | 2/2019 | H04L 41/082 |
| WO | 2020084497 A1 | 4/2020 | |

OTHER PUBLICATIONS

Japan Patent Office. First Notice of Reasons for Refusal for JP Application No. 2023-530859 and English translation, mailed May 27, 2024, pp. 1-6.

Japan Patent Office. Second Notice of Reasons for Refusal for JP Application No. 2023-530859 and English translation, mailed Oct. 30, 2024, pp. 1-6.

3GPP Technical Specification Group Services and System Aspects. "System architecture for the 5G System (5GS); Stage 2," TS 23.501, 2020.

European Patent Office. Extended European Search Report for EP Application No. 21896533.3, mailed Mar. 13, 2024, pp. 1-13.

3GPP Service & System Aspects. "Description on NF Service Registration," 3GPP SA WG2 Meeting #118bis, Jan. 2017, pp. 1-2.

ETSI Industry Network Functions Virtualisation Specification Group. "Report on Models and Features for End-to-End Reliability," NFV-REL 003, V1.1.1, 2016, pp. 1-105.

International Searching Authority. International Search Report and Written Opinion for PCT Application No. PCT/CN2021/120768 and English translation, mailed Dec. 28, 2021, pp. 1-12.

Korean Intellectual Property Office. First Office Action for KR Application No. 10-2023-7017210 and English translation, mailed Jul. 4, 2025, pp. 1-14.

\* cited by examiner

```
┌─────────────────────────────────────────────┐
│ Network slice upgrade master control unit   │
│ sends rollback instruction to the proxy     │
│ unit of each NF in the network slice        │
└─────────────────────────────────────────────┘
                      │
                      ▼
┌─────────────────────────────────────────────┐
│ Upgrade order of each NF is UDM-AMF-gNB,    │
│ then the rollback order is gNB-AMF-UDM      │
└─────────────────────────────────────────────┘
                      │
                      ▼
┌─────────────────────────────────────────────┐
│ Rollback on gNB(s): the network slice       │
│ upgrade master control unit sends a         │
│ rollback instruction to the gNB, after the  │
│ rollback on the gNB is completed, the       │
│ success of the rollback is fed back to the  │
│ network slice upgrade master control unit   │
└─────────────────────────────────────────────┘
                      │
                      ▼
┌─────────────────────────────────────────────┐
│ Rollback on AMF(s): the network slice       │
│ upgrade master control unit sends a         │
│ rollback instruction to the AMF, after the  │
│ rollback on the AMF is completed, the       │
│ success of the rollback is fed back to the  │
│ network slice upgrade master control unit   │
└─────────────────────────────────────────────┘
                      │
                      ▼
┌─────────────────────────────────────────────┐
│ Rollback on UDM(s): the network slice       │
│ upgrade master control unit sends a         │
│ rollback instruction to the UDM, after the  │
│ rollback on the UDM is completed, the       │
│ success of the rollback is fed back to the  │
│ network slice upgrade master control unit   │
└─────────────────────────────────────────────┘
```

FIG. 8

NETWORK SLICE UPGRADING METHOD AND DEVICE

CROSS-REFERENCE TO RELATED APPLICATIONS

This application is a national stage filing under 35 U.S.C. § 371 of international application number PCT/CN2021/120768, filed Sep. 26, 2021, which claims priority to Chinese patent application No. 202011338018.4 filed Nov. 25, 2020. The contents of these applications are incorporated herein by reference in their entirety.

TECHNICAL FIELD

The present disclosure relates to the technical field of communication, in particular to a method and a device for upgrade in a network slice.

BACKGROUND

In 5G communication, Network Slice (NS) is the slicing of the physical network into multiple end-to-end virtual networks as required. Each network slice can meet different types of requirements of, such as massive machine communication requirements, ultra-high reliability and low delay requirement, or enhanced mobile broadband requirements. A network slice can include multiple network slice subnet (NSS), such as a radio access network sub-slice, a core network sub-slice, a bearer network sub-slice, and so on. A network sub-slice can have one or more network functions NFs. And one NF can be dedicated to one network slice or one sub-slice, and can also be shared by multiple network slices or sub-slices at the same time.

Network Slicing Management Function (NSMF) is responsible for the instantiation of network slices and the control and management of their life cycle. Network Slice Subnet Management Function (NSSMF) is responsible for the instantiation of sub-slice and the control and management of life cycle of the sub-slice.

Figure 1:
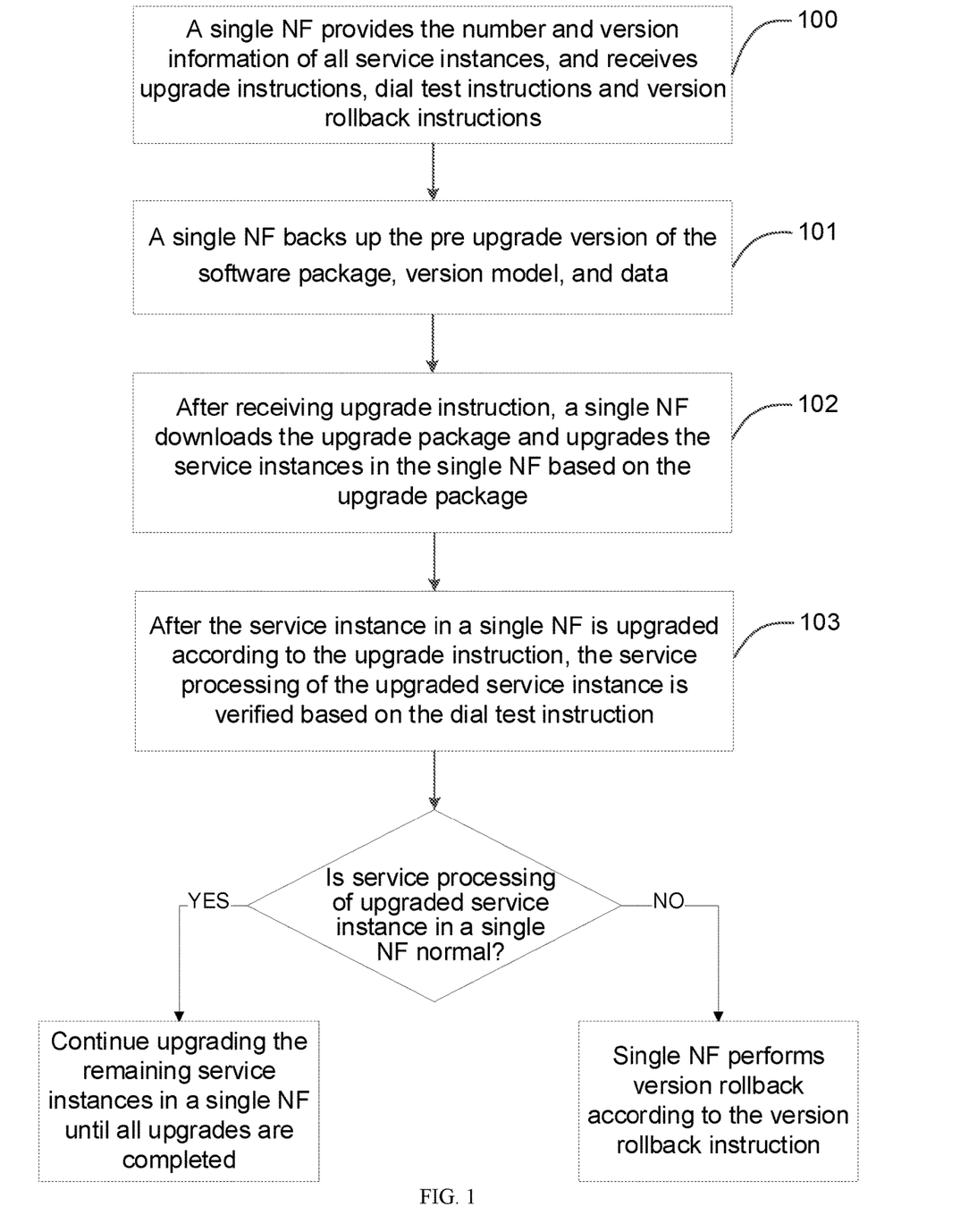
FIG. 1 depicts a flowchart showing a method for upgrading an NF in some situations in the art.

5G NF adopts a service-based architecture. One NF has multiple different types of services. Each type of service can have one or more service instances running, and multiple service instances can share the load. The upgrade of the network slice involves end-to-end network, covering radio access network, core network and bearer network. NFs in many domains needs to be upgraded cooperatively, and the service processing of the entire end-to-end network of network slice shall be prevented from being affected during the upgrade. In the existing technology version upgrade is performed to a single NF merely, as shown in FIG. 1. During the upgrade, the service instances in a single NF can be upgraded once or in stages. However, in some cases, it is unable to achieve the collaborative upgrade of networks in multiple specialties and multiple NFs under network slicing. It is also unable to perform a dial test on the network slice end-to-end to verify the running effect of the new version with low risk during the upgrade, so as to complete all the upgrades after the verification is passed. At the same time, when upgrading a single NF, another NF will be affected in the network slice, resulting in failure in the processing of the end-to-end service of the network slice.

SUMMARY

In order to alleviate at least one of the above technical problems, the present disclosure provides a method and a device for upgrade in a network slice.

The following technical scheme is included in an embodiment of the present disclosure.

The network slice upgrade master control unit inquires the NSMF for the information of the network slice instance and the network sub-slice instance, and inquires the wireless access network NSSMF, the core network NSSMF and the bearer network NSSMF for the information of the network sub-slice instances and NFs respectively, and inquires the version information of all NFs, as well as the types, number and version information of each type of service instances in the NFs. Each NF includes different types of service instances, and different types of service instances handle different services. The network slice upgrade master control unit can show the topology diagram of the attribute relationship of network slices, network sub-slices and NFs, as well as the version information of NF service instances.

The network slice upgrade master control unit can arrange the network slice upgrade plan, the network slice dial test plan and the network slice rollback plan.

The network slice upgrade plan at least includes the upgrade order of each NF in the network slice, the service types that each NF needs to upgrade, and the proportion of service instances of each service type and each version during the upgrade.

The network slice dial test plan at least includes network slice for dial test, users for dial test, services for dial test, NFs for dial test, and service versions for dial test.

The network slice rollback plan at least includes the NF range at which the rollback is performed and the rollback order for each NF.

The network slice upgrade master control unit sends an upgrade instruction to each NF. Each NF downloads an upgrade package and backs up the current version, current model and data. The upgrade instruction carries a preset upgrade proportion. The proxy unit upgrades the service instances on the NFs and reports the progress to the network slice upgrade master control unit.

After each NF upgrades the service instance according to the preset upgrade proportion, the network slice upgrade master control unit issues a network slice dial test instruction to each NF to start end-to-end dial test to verify the service processing of the new version of the service instance in the network slice. If the service dial test verification indicates a normal condition, the network slice upgrade master control unit continues to upgrade the rest of the service instances of NF under the coverage of the network slice until all the upgrades are completed.

If the service dial test verification indicates an abnormal condition, it is necessary to perform network slice version rollback. The network slice upgrade master control unit then issues a network slice version rollback instruction to each NF. And each proxy unit completes each NF version rollback.

In an embodiment of the present disclosure, there is provided a method for upgrade in a network slice, which is applied to each Network Function (NF) in a network slice, the method may include, acquiring version information of each service instance, and receiving an upgrade instruction; downloading an upgrade package after receiving the upgrade instruction, and simultaneously performing an upgrade to a service instance in each NF according to the upgrade package until each upgrade is completed; where the upgrade instruction includes a preset upgrade proportion and an upgrade order.

In an embodiment of the present disclosure, there is further provided a device for upgrade in a network slice, which may include, a network slice upgrade master control unit, which is configured to inquire version information of service instance in each Network Function (NF) in the network slice and issue an upgrade instruction; at least two model and data management units, each of which is configured to manage a software package, a model and data of each version of service instance in each NF in the network slice; and at least two proxy units, each of which is configured to download an upgrade package after receiving the upgrade instruction by each NF in the network slice, and simultaneously perform an upgrade to a service instance in each NF according to the upgrade package until each upgrade is completed; where, the upgrade instruction includes a preset upgrade proportion and an upgrade order.

DETAILED DESCRIPTION

The technical scheme of the present disclosure will be illustrated in conjunction with the drawings below. In the description of the present disclosure, it should be understood that the terms "first" and "second" are only illustrative, and it is not intended to be interpreted as indicating or implying relative importance or implicitly indicating the number of indicated technical features, and are only intended to distinguish different components. Throughout the present disclosure, the "first service instance" includes the service instance that needs an upgrade in each NF in the network slice, and the "second service instance" includes the service instance that needs a network slice version rollback in each NF in the network slice.

Figure 2:
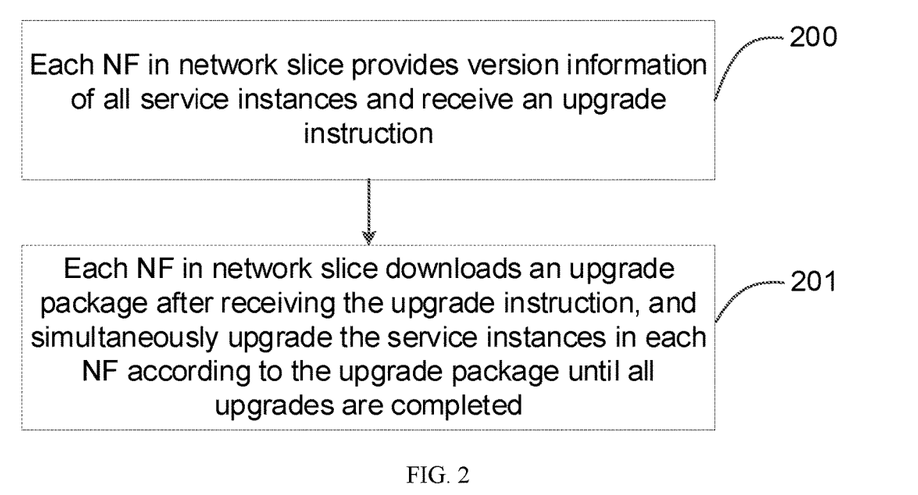
FIG. 2 depicts a flowchart showing a method according to an embodiment of the present disclosure.

FIG. 2 depicts a flowchart showing a method in an embodiment of the present disclosure. As shown in FIG. 2, each NF in a network slice is configured to, acquire version information of all service instances and receive an upgrade instruction at 200; and to download an upgrade package after receiving the upgrade instruction, and simultaneously upgrade the service instances in each NF according to the upgrade package until all upgrades are completed. The upgrade instruction includes a preset upgrade proportion and an upgrade order.

In an implementation, before the service instance of each NF in the network slice is upgraded, the software package, model and data of the pre-upgrade version of the service instance are backed up.

In an implementation, the acquisition of the version information of all service instances by each NF in a network slice includes: NSMF in the network slice first provides the information of NSSMF instance(s), network slice instance(s) and network sub-slice instance(s). Then NSSMF provides the information of network sub-slice instance and the NF. At last, the NF provides the type, number and version information of all service instances. Generally, the type and number of service instances are intended to determine the upgrade instruction. For example, the preset upgrade proportion is determined according to the number of service instances. An appropriate upgrade proportion as determined can ensure that the current upgrade will not adversely impact the routine service processing.

Figure 7:
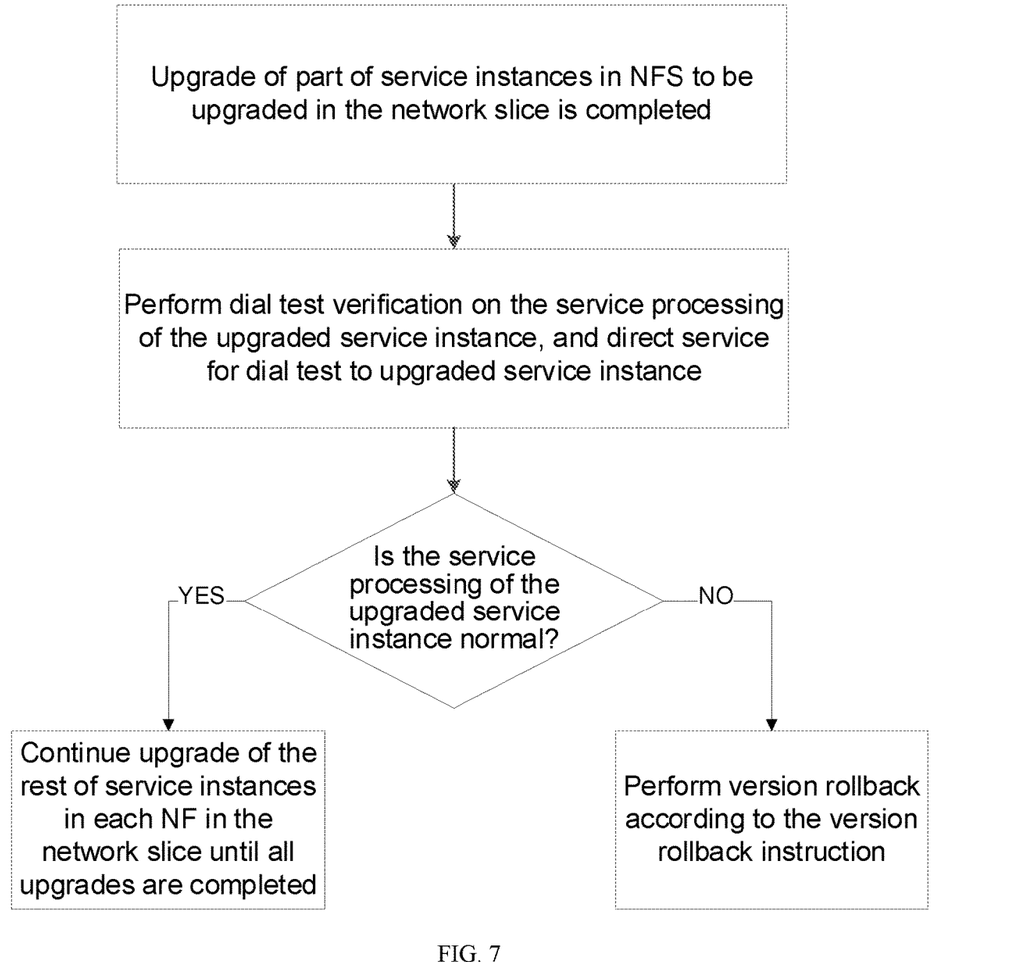
FIG. 7 depicts a flowchart showing a network slice dial test verification.

In an implementation, each NF in a network slice also receives a network slice dial test instruction and a network slice version rollback instruction. The service processing situation of the upgraded service instances in each NF in the network slice is verified according to the network slice dial test instruction. If the verification indicates a normal situation, the upgrade of the remaining service instances in each NF is performed in the network slice until all upgrades are completed. If the verification indicates an abnormal situation, each NF in the network slice performs version rollback according to the network slice version rollback instruction. When being carried out, the network slice upgrade and dial test method of the present application will not adversely impact the routine process of the end-to-end service of the network slice. In an implementation, the verification is as follows. After part of the service instances in all NFs that need to be upgraded in the network slice are upgraded, the rest of the service instances are still waiting to be upgraded in the NFs. In such a case, the service processing of the upgraded service instance is verified first. Then, the service is diverted to the upgraded service instance. That is, the dial test service is directed to the upgraded service instance. The verification on the service instance passes when the service instance processes the service properly, as shown in FIG. 7.

Figure 3:
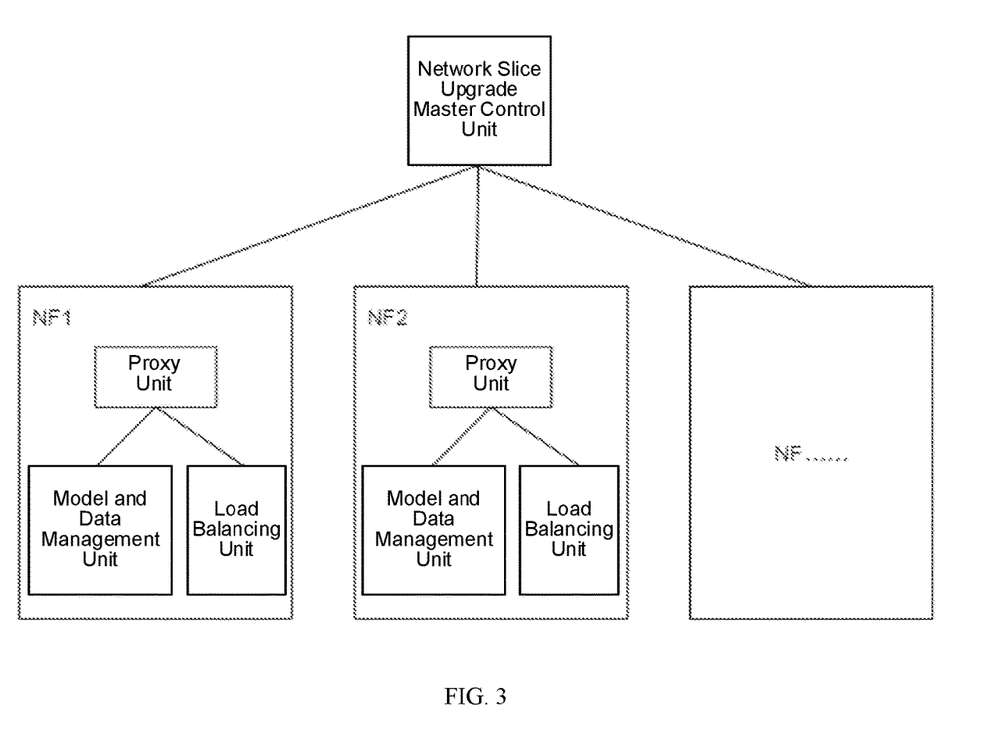
FIG. 3 depicts a schematic diagram showing a device according to an embodiment of the present disclosure.

FIG. 3 depicts a schematic diagram showing a device in an embodiment of the present disclosure. The device includes a network slice upgrade master control unit, at least two model and data management units and at least two proxy units. The network slice upgrade master control unit is configured to manage the software versions of all NFs in the entire network slice, inquire about the version information of all service instances in all NFs in the network slice, and issue an upgrade instruction, a network slice dial test instruction and a network slice version rollback instruction. The model and data management unit is configured to manage multiple sets of different versions of models and data in a single NE. The proxy unit is configured to manage the versions of a single NF, download the upgrade package after receiving the upgrade instruction, and simultaneously upgrade the service instances in each NF according to the upgrade package. The upgrade instruction includes a preset service instance upgrade proportion. During the upgrade, the progress of the upgrade can be reported to the network slice upgrade master control unit in real-time.

The inquiry of service instance version information in each NF by the network slice upgrade master control unit includes, inquiring to the NSMF the NSSMF instance, network slice instance and network sub-slice instance information, then inquiring to the NSSMF, the network sub-slice instance and NF information, and inquiring to all NFs in the network slice, the type, number and version information of service instances of each type.

The proxy unit is further configured to: verify, after the service instances in each NF are upgraded according to the upgrade instruction, the service processing conditions of the upgraded service instances according to the network slice dial test instruction, and in response to the verification indicating a normal condition, continue to upgrade the rest of the service instances in each NF until the upgrade of each instance is completed; and in response to the verification indicating an abnormal condition, perform version rollback according to the network slice version rollback instruction.

The device also includes at least two load balancing units. The load balancing units are mainly configured to distribute services to service instances in each NF, and transfer and divert the services over the service instances. In an implementation, the load balancing units transfer the services on the service instances that need to be upgraded to the service instances that are not to be upgraded temporarily and to the temporary service instances. Alternatively, the load balancing units transfer the services on the temporary service instances to the service instances whose upgrade is completed, or divert the services of the dial test network slices to the upgraded service instances.

Figure 4:
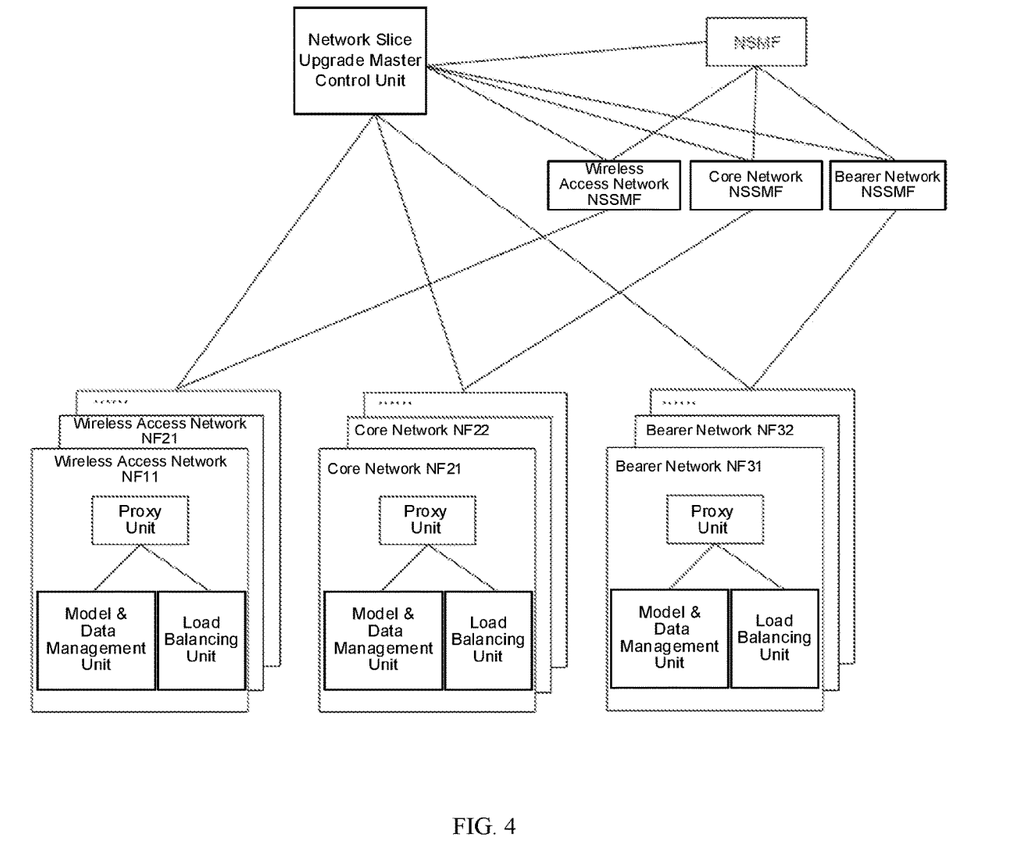
FIG. 4 depicts a schematic diagram showing a device according to an embodiment of the present disclosure.

FIG. 4 depicts a device in an embodiment of the present disclosure. As shown in FIG. 4, the network slice upgrade master control unit is connected with an NSMF and an NSSMF. The NSSMF can be classified, by the specialized fields, as a wireless access network NSSMF, a core network NSSMF and a bearer network NSSMF. Each of the wireless access network NSSMF, the core network NSSMF and the bearer network NSSMF includes at least one NF each deployed with an proxy unit, a model and data management unit and a load management unit.

In an implementation, the network slice upgrade master control unit can be an independently deployed management system. Alternatively, the network slice upgrade master control unit can be integrated with other management systems. Generally, the proxy unit, the model and data management unit and load balancing unit are collectively deployed on the NF.

In an implementation, the preparation of network slice before upgrading includes the following. (1) The network slice upgrade master control unit queries the NSMF to obtain all network slice instance information and network sub-slice instance information in the network. The network slice upgrade master control unit respectively inquires about the wireless access network NSSMF, the core network NSSMF and the bearer network NSSMF to obtain the each network sub-slice instance information and NF information. The network slice upgrade master control unit queries each NF respectively, and obtains the version information of each NF, and the type, number and version information of service instances of each type. Then, the network slice upgrade master control unit displays the topology diagram of attribute relationship of 5G network slice, network sub-slice and NF, and the type, number and version information of each type of service instance in each NE. (2) A network slice upgrade package is uploaded to the network slice upgrade master control unit. The network slice upgrade package includes upgrade packages of each type of NF in the network slice. The network slice instances to be upgraded and the corresponding network slice upgrade packages are selected. (3) The network slice upgrade master control unit parses the upgrade package and automatically selects the NF instance to be upgraded in the network slice. (4) The network slice upgrade master control unit arranges the network slice upgrade plan according to the predetermined rules, including the upgrade order of each NF in the network slice, the service types that each NF needs to upgrade, and the proportion of new and old service instances of various service types during the upgrade. In an implementation, NFs of the data type are upgraded first, then NFs of the service type are upgraded. In another implementation, one NF of a particular type is upgraded first, and then the rest of the NFs of that particular type are upgraded in parallel. In yet another example, the proportion of upgraded service instances is 1:3 before the dial test, and only ⅓ of the service instances are upgraded. After the dial test, the proportion of upgraded service instances is 3:3, that all service instances should be upgraded. If the proportion of upgraded services before the dial test is 2:3, it is necessary to perform verification by dial test after ⅔ of the service instances are upgraded. After the dial test, the proportion of upgraded service instances is 3:3, that all service instances should be upgraded. (5) The network slice upgrade master control unit arranges the network slice dial test plan which includes network slice instances for dial test, a list of NF service instances for dial test, users for dial test, and services for dial test. (6) The network slice upgrade master control unit automatically arranges a rollback plan for failed network slice upgrade according to a predetermined rollback policy, including NF instances needing rollback and the rollback order of each NF. In an example, a partial rollback involves the NFs with failed upgrade. In another example, an entire rollback involves all the NFs with failed upgrade and successful upgrade. In yet another example, a rollback with the reverse order of the upgrade is carried out, in which the last upgraded NF is subject to the first rollback, while the first upgraded NF is subject to the last rollback. (7) The network slice upgrade plan, the network slice dial test plan and the network slice rollback plan are checked on the network slice upgrade master control unit. The network slice upgrade master control unit starts to execute the plans after the plans are confirmed to be correct. (8) The network slice upgrade master control unit sends a pre-upgrade preparation instruction to the proxy unit. The proxy unit downloads the NF upgrade package matched with this NF from the network slice upgrade master control unit, verifies the validity of the upgrade package, and stores the same locally in the proxy unit. The model and data management unit on the NF backs up the currently running pre-upgrade version files, models and data, so as to prepare for version rollback in case of an abnormal condition.

Figure 5:
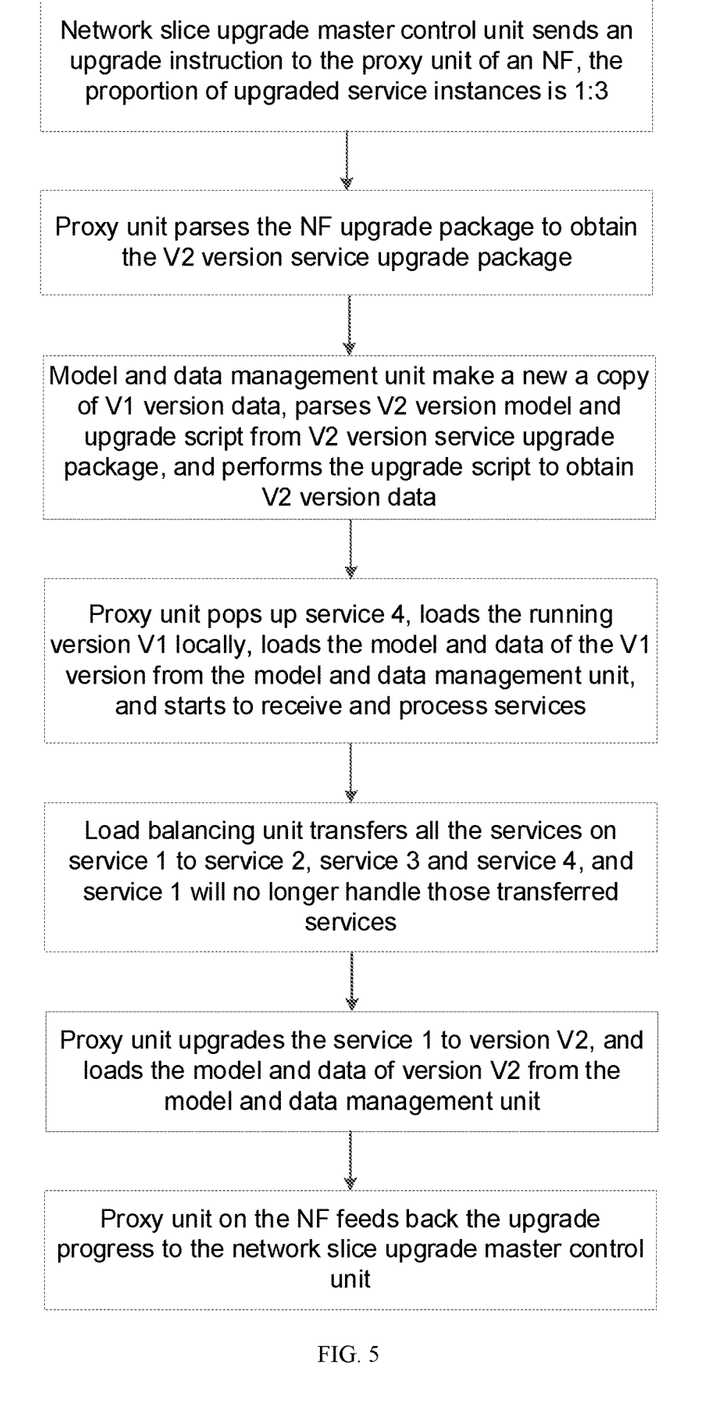
FIG. 5 depicts a flowchart showing an upgrade to a single NF.

FIG. 5 depicts a flow chart showing upgrade of a single NF. In each NF, multiple service instances of the same type are operating in a load sharing manner. The upgrade procedure from version V1 to version V2 for services 1, 2 and 3 of the same service types is illustrated below.

(1) The network slice upgrade master control unit sends an upgrade instruction to the proxy unit of an NF. The proportion of upgraded service instances is 1:3, that is, only one service instance is upgraded.
(2) The proxy unit parses the NF upgrade package to obtain the V2 version service upgrade package.
(3) The model and data management unit makes a new a copy of V1 version data, parses V2 version model and upgrade script from V2 version service upgrade package, and performs the upgrade script to obtain V2 version data.
(4) The proxy unit pops up service 4, loads the running version V1 locally, loads the model and data of the V1 version from the model and data management unit, and starts to receive and process services.
(5) The load balancing unit transfers all the services on service 1 to service 2, service 3 and service 4, and service 1 will no longer handle those transferred services.
(6) The proxy unit upgrades the service 1 to version V2, and loads the model and data of version V2 from the model and data management unit.

(7) The proxy unit on the NF feeds back the upgrade progress to the network slice upgrade master control unit.

For the upgrade of the whole network slice, it is necessary to coordinate multiple NFs in the network slice end-to-end, and dial test to verify the service instances of each NF upgraded in the network slice end-to-end. For example, in order to support a new feature of the network slice, it is necessary to perform an upgrade in a number of NFs in the network slice, e.g., three gNBs (gNodeB, 5G base stations), two access and mobility management functions (AMFs) and one Unified Data Management (UDM). The upgrade order is: the upgrade in the UDM is carried out first, followed by is the upgrade in the AMFs, and the upgrade in the gNBs is carried out at last. For example, there are two service instances of the same type in the gNB, three service instances of the same type in the MF and three service instances of the same type in the UDM, and each service instance operates in a load sharing manner.

Figure 6:
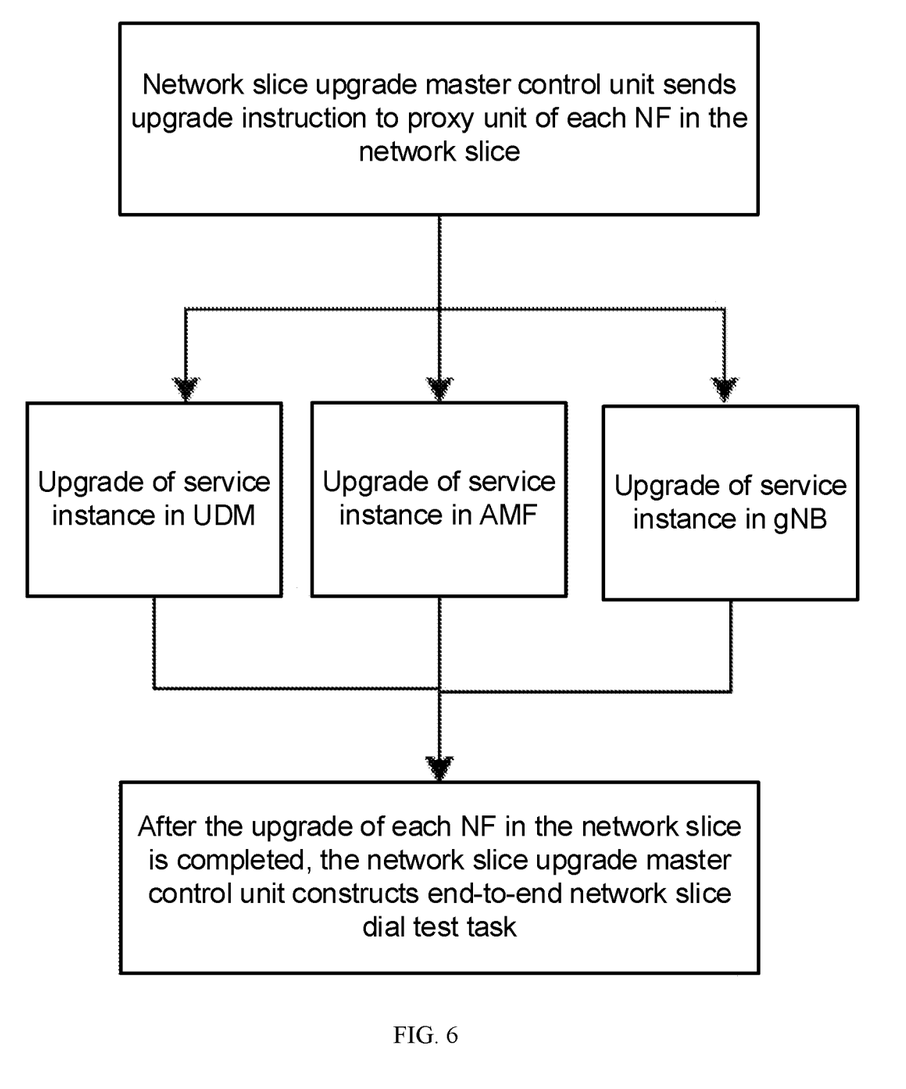
FIG. 6 depicts a flowchart showing an upgrade to the entire network slice.

According to the above upgrade order, the upgrade operations of the whole network slice are as follows, as shown in FIG. 6.

(1) Upgrade in the UDM: the network slice upgrade master control unit sends an upgrade instruction to the UDM, and the service instance upgrade proportion is 1:3, that is, only one service instance is upgraded. After the upgrade is completed, the proxy unit on the UDM feeds back the upgrade progress to the network slice upgrade master control unit.

(2) Upgrade in the AMFs: the network slice upgrade master control unit sends an upgrade instruction to the first AMF, and the service instance upgrade proportion is 1:3, that is, only one service instance is upgraded. After the upgrade is completed, the proxy unit on the first AMF feeds back the upgrade progress to the network slice upgrade master control unit. The network slice upgrade master control unit sends an upgrade instruction to the second AMF, and the proportion of upgrading service instances is 1:3, that is, only one service instance is upgraded. After the upgrade is completed, the proxy unit on the second AMF feeds back the upgrade progress to the network slice upgrade master control unit.

(3) Upgrade in the gNBs: the network slice upgrade master control unit sends an upgrade instruction to the first gNB, and the service instance upgrade proportion is 1:2, that is, only one service instance is upgraded. After the upgrade is completed, the proxy unit on the first gNB feeds back the upgrade progress to the network slice upgrade master control unit. The network slice upgrade master control unit then sends upgrade instructions to the second and third gNBs, and the proportion of upgrading service instances is 1:2, that is, only one service instance in each gNB is upgraded. After the upgrades are completed, the proxy units on the second and third gNB feed back the upgrade progress to the network slice upgrade master control unit.

(4) After each NF upgrades a part of the service instances to a new version according to the desired proportion, the network slice upgrade master control unit creates a network slice dial test task, including network slice for dial test, users for dial test, services for dial test and service version for dial test, and the task is sent to each NF under the network slice. The load balancing unit of each NF directs the network slice for dial test, users for dial test and service for dial test to the service instance that has been upgraded to a particular version to verify the service for dial test. If the service dial test verification indicates an abnormal condition, troubleshooting is made to find to cause and the problem. The upgrade will be terminated if necessary, and the network slice rollback plan will be carried out, in which each NF in the network slice carries out the network slice version rollback. If the service dial test verification indicates a normal condition, the network slice upgrade master control unit continues to issue upgrade instructions to upgrade the rest of the service instances of NFs under the coverage of network slices.

The service dial test verification indicates a normal condition, which means end-to-end service dial test verification of the network slice indicates a normal condition, such that the rest of the service instances of NF under the coverage of the network slice can be upgraded successively. In an implementation, the NF belongs exclusively to network slice 1, and there are service instances of the same type and version (including service 1, service 2 and service 3) in this NF, and each service instance operates in a load sharing manner. If service 1 has been upgraded to version V2, service 2, service 3 and service 4 are still in version V1, and service 4 is a temporary service instance popped up by the proxy unit during the upgrade, then service 2 and service 3 shall be upgraded to version V2, and service 4 should be terminated when the upgrade is completed. The operations are as follows.

(1) The network slice upgrade master control unit sends a continual upgrade instruction to the proxy unit on NF.

(2) The load balancing unit transfers all the services on the service 2 to the services 1, 3 and 4. Service 2 will no longer handle those transferred services.

(3) The proxy unit upgrades the service 2 to version V2, and loads the model and data of version V2 from the model and data management unit.

(4) The proxy unit continues to upgrade service 3 in the same way as the upgrading of service 2.

(5) Service 1, Service 2 and Service 3 are all upgraded to V2 version.

(6) The load balancing unit transfers all the services on the service 4 to the services 1, 2 and 3. Service 4 will no longer handle those transferred services.

(7) The proxy unit terminates service 4.

(8) The proxy unit responds to the network slice upgrade master control unit that all services dedicated to the NF have been upgraded successfully.

If the network slice service dial test verification indicates an abnormal condition, the network slice upgrade master control unit needs to perform network slice version rollback for each NF in the network slice according to the network slice rollback plan. Taking the version rollback of a single NF as an example, the version rollback of a single NF includes two scenarios. Scenario 1: The version of service 1 in NF is V2 version and needs to be rollback to V1 version. The versions of service 2, service 3 and service 4 are all V1 version, so there is no need to rollback. In particular, service 4 is a temporary service instance that pops up during the upgrade process, and which shall be terminated after the version rollback is completed. Scenario 2: All services in the NF have been upgraded, and the versions of service 1, service 2 and service 3 are all V2, which is necessary to roll back to V1. The operations of version rollback are as follows.

(1) The network slice upgrade master control unit of the network slice receives the NF upgrade failure message, and carries out operations according to the network slice rollback plan.
(2) The network slice upgrade master control unit issues a network slice version rollback instruction to the proxy unit.
(3) The proxy unit locally extracts the V1 version software package backed up before the upgrade. The model and data management unit locally extracts the V1 model and data backed up before the upgrade.
(4) The proxy unit checks the running service instance and version, and determines which service instance needs version rollback.
(5) If the service 4 does not exist, the proxy unit pops up the service 4, loads the version V1 locally, loads the model and data of the V1 version from the model and data management unit, and starts to receive and process services. If the version of service 1 needs to roll back to V1 version, the load balancing unit will transfer all the services on service 1 to service 2, service 3 and service 4, and service 1 will no longer handle those services. The proxy unit rollbacks the version in service 1 to V1 version, and loads the model and data of the V1 version from the model and data management unit to start receiving and processing services. The load balancing unit distributes the services to service 1 to verify whether the service processing of service 1 is normal. If the service processing on service 1 is abnormal, it is necessary to find the cause of the problem and eliminate the fault. If the service processing on service 1 is normal, that indicates a successful version rollback on service 1.
(6) The proxy unit makes determinations and rolls back the versions of service 2 and service 3 successively, and the method is the same as that of the rollback on service 1.
(7) After the versions of service 1, service 2 and service 3 all fall back to V1 version, the load balancing unit transfers all the services on service 4 to service 1, service 2 and service 3, and service 4 will no longer handle the services. Then the proxy unit terminates service 4, and notifies the network slice upgrade master control unit that the NF rollback is successful.

For the rollback of the whole network slice, it is necessary to perform rollback in multiple NFs in the network slice. For example, the NF involved in the upgrade process of the network slice is: three gNBs, two AMFs and one UDM respectively. Rollback shall be performed if the upgrade fails. Sequential rollback is performed, that is, the rollback is performed in the reverse order of the upgrade order. And if the upgrade order is UDM-AMF-gNB, then the rollback order is gNB-AMF-UDM.

Figure 8:
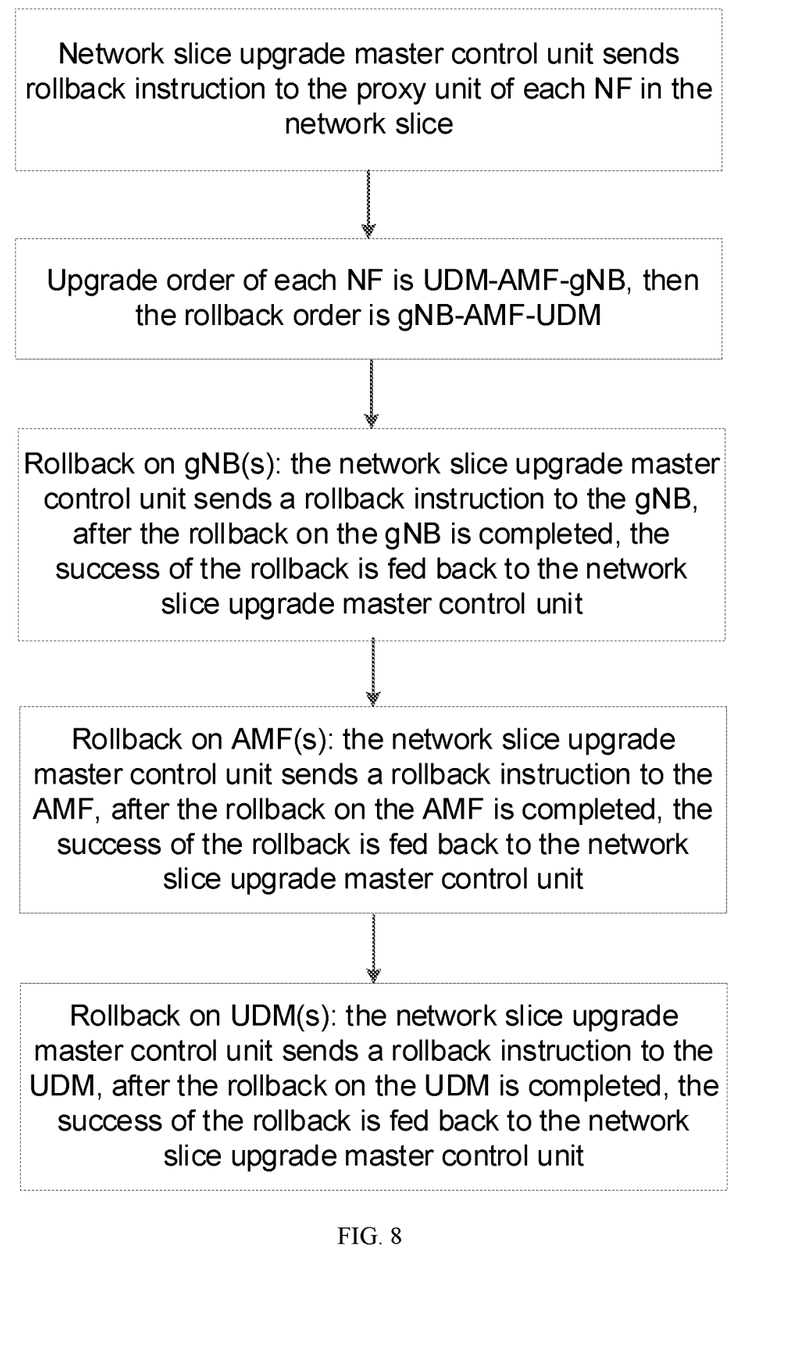
FIG. 8 depicts a flowchart showing network slice version rollback.

According to the above rollback order, the rollback operations of the whole network slice are as follows, as shown in FIG. 8.

(1) Rollback on gNBs: the network slice upgrade master control unit sends a rollback instruction to the first gNB. After the rollback on the first gNB is completed, the proxy unit on the first gNB feeds back the success of the rollback to the network slice upgrade master control unit. The network slice upgrade master control unit then sends rollback instructions to the second and third gNBs. After the rollbacks on the second and third gNBs are completed, the proxy units on the second and third gNBs feed back the success of the rollbacks to the network slice upgrade master control unit.
(2) Rollback on AMFs: the network slice upgrade master control unit sends a rollback instruction to the first AMF. After the rollback on the first AMF is completed, the proxy unit on the first AMF feeds back the success of the rollback to the network slice upgrade master control unit. The network slice upgrade master control unit sends a rollback instruction to the second AMF. After rollback on the second AMF is completed, the proxy unit on the second AMF feeds back the success of the rollback to the network slice upgrade master control unit.
(3) Rollback on UDM: the network slice upgrade master control unit sends a rollback instruction to the UDM. After the rollback is completed, the proxy unit on the UDM feeds back the success of the rollback to the network slice upgrade master control unit.

The method and the device for upgrading the network slice have the advantages that the wireless access network, the core network and the bearer network are globally upgraded end-to-end at the level of the network slice, and a plurality of NFs within the coverage area of the network slice are upgraded together in a cooperative manner, so that the maintainability of the network is improved. Only a part of the service instances of each NF is upgraded at the same time, and each NF directs the dial test service to the upgraded service instance, and verifies the service processing condition of the new version service instance end to end, and upgrades the rest of the service instances of NF under the coverage of network slices after the verification is passed. If the dial test fails, version rollback in the NFs under the network slice can be performed in order. In addition, the whole process of upgrading, dial testing and rollback in the present application will not impact adversely the routine processing of the end-to-end service of the network slice.

The above are some embodiments of the present disclosure, and the protection scope of the present disclosure is defined by the claims and their equivalents.

What is claimed is:

1. A method for upgrade in a network slice having at least one Network Function (NF) each having a plurality of different types of services having a plurality of service instances, wherein the method is applied to each of the at least one NF, the method comprising:
    acquiring version information of each of the plurality of service instances, and receiving an upgrade instruction;
    downloading an upgrade package after receiving the upgrade instruction; and
    performing an upgrade to each of the plurality of service instances according to the upgrade package until each upgrade is completed;
    wherein, the upgrade instruction comprises a preset upgrade proportion and an upgrade order, and the service instances to which the upgrade is to be performed, comprise a plurality of first service instances; and
    preforming the upgrade after receiving the upgrade instruction comprises, popping up a temporary service instance that loads a software package, a model and data of a version before the upgrade to start to service receiving and processing, performing the upgrade to each of the first service instances after each service on each of the first service instances is transferred to a service instance to which the upgrade will not be performed temporarily and to the temporary service instance, and removing the temporary service instance in response to a success in the upgrade to each of the first service instances, or removing the temporary service instance in response to a completion of a version rollback in response to a failure in the upgrade to one of the first service instances.

2. The method according to claim 1, wherein, before performing the upgrade to each of the plurality of service instances, backing up a software package, a model and data of a version before the upgrade of the respective service instance.

3. The method according to claim 2, wherein each NF in the network slice is configured to receive a network slice dial test instruction and a network slice version rollback instruction, and     after the upgrade to a part of the plurality of service instances is completed according to the upgrade instruction, the method further comprises, performing a verification to a service processing condition of each upgraded part of the plurality of service instances according to the network slice dial test instruction, and in response to the verification indicating a normal condition, continue to perform the upgrade to a rest of the service instances in each NF until the upgrade of each service instance is completed; and     in response to the verification indicating an abnormal condition, perform a version rollback according to the network slice version rollback instruction.

4. The method according to claim 3, wherein, the service instances to which the upgrade is to be performed, comprises a plurality of first service instances, in response to the plurality of first service instances belonging to different NFs, successively performing the upgrade to each of the first service instances separately according to the upgrade proportion and the upgrade order of a respective NF, or simultaneously performing the upgrade to each of the first service instances separately according to the upgrade proportion; and in response to the plurality of first service instances belonging to a same NF, performing the upgrade to each of the first service instances according to the upgrade proportion; and     preforming the upgrade after receiving the upgrade instruction comprises, popping up a temporary service instance that loads a software package, a model and data of a version before the upgrade to start to service receiving and processing, performing the upgrade to each of the first service instances after each service on each of the first service instances is transferred to a service instance to which the upgrade will not be performed temporarily and to the temporary service instance, and removing the temporary service instance in response to a success in the upgrade to each of the first service instances, or removing the temporary service instance in response to a completion of a version rollback in response to a failure in the upgrade to the one of the first service instances.

5. The method according to claim 2, wherein, in response to the plurality of first service instances belonging to different NFS, successively performing the upgrade to each of the first service instances separately according to the upgrade proportion and the upgrade order of a respective NF, or simultaneously performing the upgrade to each of the first service instances separately according to the upgrade proportion; and in response to the plurality of first service instances belonging to a same NF, performing the upgrade to each of the first service instances according to the upgrade proportion.

6. The method according to claim 5, wherein performing the version rollback comprises,     after receiving a message indicating a failure in the upgrade of the NF, receiving, by each NF, a network slice version rollback instruction, extracting a software package of version before the upgrade, inquiring about a running service instance and version information of the running service instance, and determining a second service instance to which the version rollback is performed;

extracting the model and the data of the version before the upgrade, and loading the software package, model and data of the version before the upgrade, by the temporary service instance;

transferring each service on the second service instance to the service instance to which the version rollback will not be performed temporarily and to the temporary service instance;

in response to the version rollback to the second service instance being performed, loading the software package, the model and the data of the version before the upgrade to start the service receiving and processing; diverting each service to the second service instance, performing a verification as to whether the service processing of the second service instance is normal, and     in response to a success in the version rollback to the second service instance,         transferring each service from the temporary service instance to the second service instance, and         removing the temporary service instance.

7. The method according to claim 6, wherein the version rollback of the network slice comprises an entire rollback and a partial rollback, both of the entire rollback and the partial rollback further comprise a sequential rollback, and the entire rollback comprises the rollback in each of service instances that have a successful upgrade and in each of service instances that have a failed upgrade, when a verification on at least one of the service instances in the network slice indicates an abnormal condition after the upgrade; and     the partial rollback comprises the rollback only in each of service instances that have a failed upgrade; and the sequential rollback comprises the rollback performed in reverse order with respect to the upgrade order.

8. The method according to claim 1, wherein acquiring the version information of each of the plurality of service instances comprises,     providing, by a Network Slicing Management Function (NSMF) in the network slice, information of a Network Slice Subnet Management Function (NSSMF) instance, network slice instance and network sub-slice instance;

providing, by the NSSMF, information of network sub-slice instances and each NF; and     providing, by each NF, version information of each of the plurality of service instances.

* * * * *